April 22, 1952     Z. MAAR     2,593,686
SELF-WINDING TIMEPIECE FOR VEHICLES
Filed June 17, 1948     3 Sheets-Sheet 1
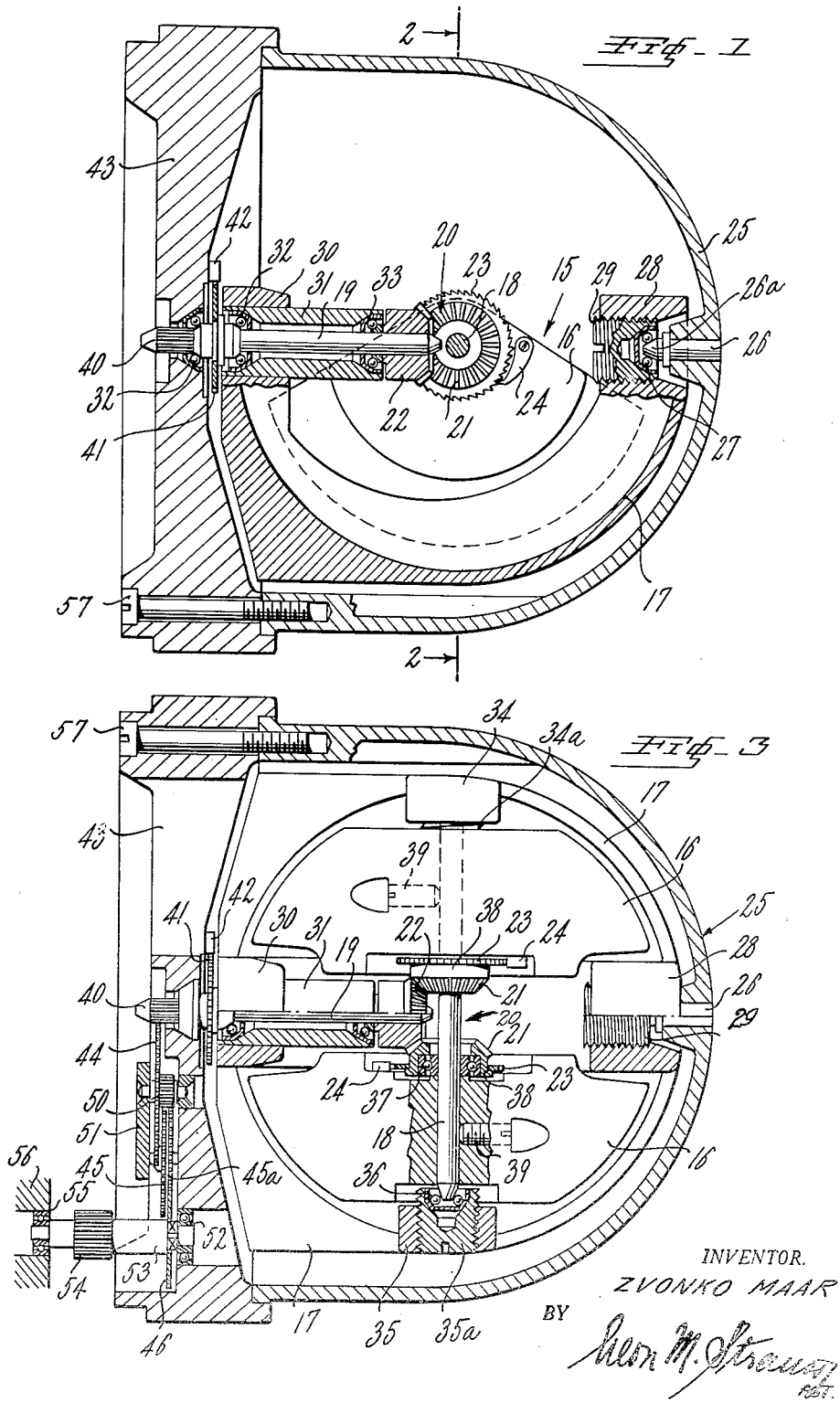
INVENTOR.
ZVONKO MAAR April 22, 1952  Z. MAAR  2,593,686
SELF-WINDING TIMEPIECE FOR VEHICLES
Filed June 17, 1948  3 Sheets-Sheet 2
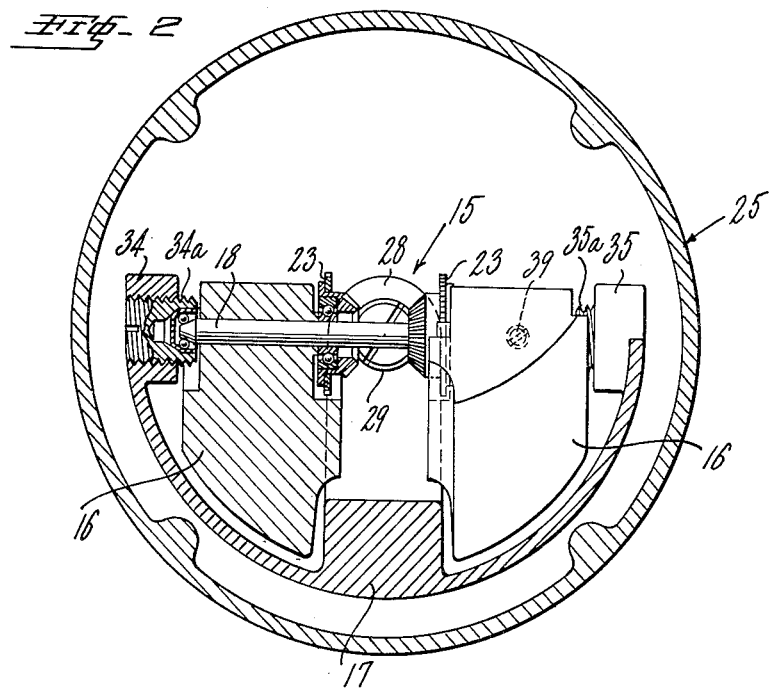
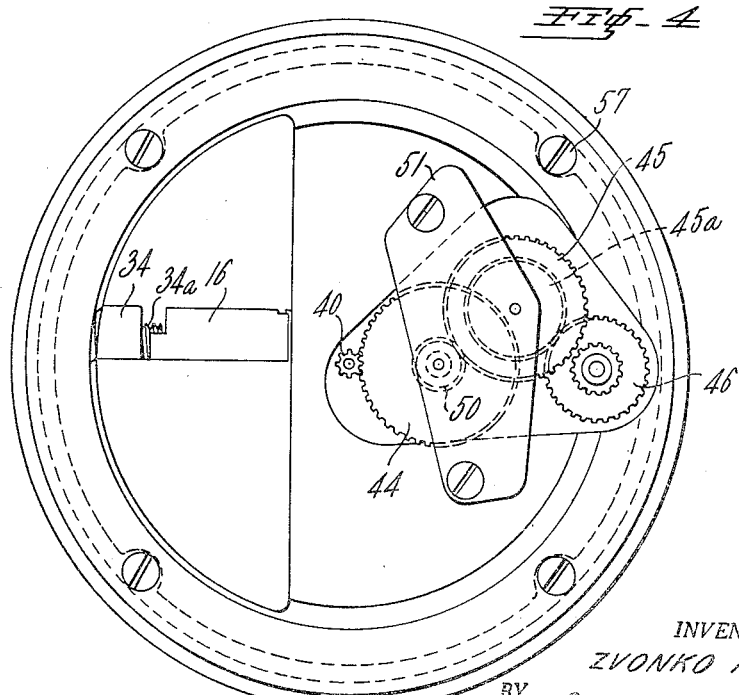
INVENTOR.
ZVONKO MAAR
BY
Leon M. Strauss
Att.

April 22, 1952  Z. MAAR  2,593,686
SELF-WINDING TIMEPIECE FOR VEHICLES
Filed June 17, 1948  3 Sheets-Sheet 3
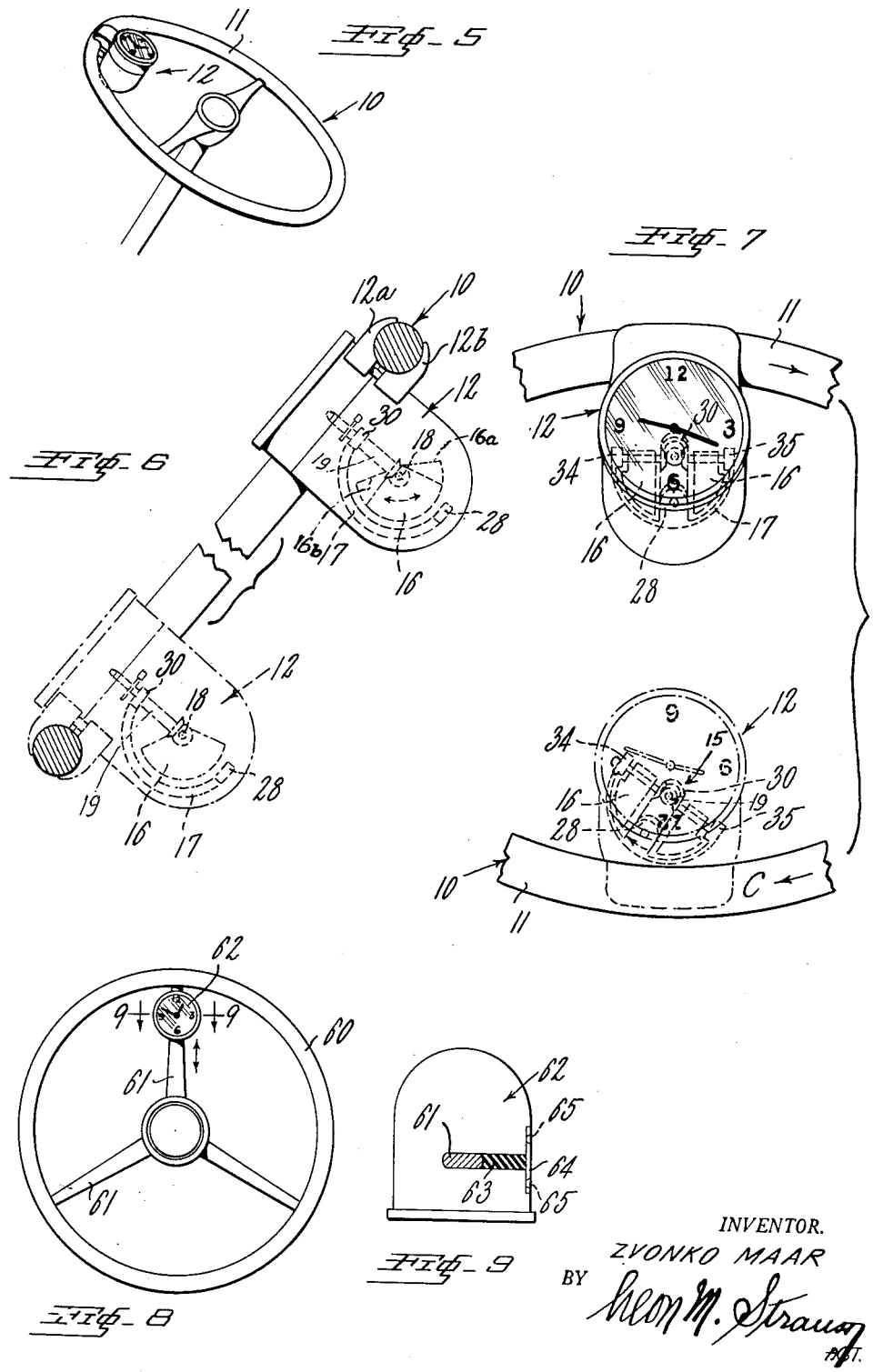
INVENTOR.
ZVONKO MAAR Patented Apr. 22, 1952

2,593,686

UNITED STATES PATENT OFFICE 2,593,686

SELF-WINDING TIMEPIECE FOR VEHICLES

Zvonko Maar, Zurich, Switzerland

Application June 17, 1948, Serial No. 33,575

6 Claims. (Cl. 58—46)

This invention relates to self-winding clocks or similar timepieces which are equipped with a mechanism for winding up the work or movement of the clock.

The present invention pursues a novel path insofar as it makes use of a power source for moving the self-winding mechanism of a clock which clock is positioned on the steering wheel of a vehicle, said power source resulting from the to and fro and rotative movements of said steering wheel and vibrations caused by said vehicle in motion, whereby power source is transmitted to said pendulum means for winding up said clock mechanism.

It is one object of the invention to provide means affording ready installation of the clock or timepiece on the steering wheel of a vehicle, thus ensuring reliable and very efficient operation of the winding-up mechanism of the clock for which serves as a power source any oscillations caused by momentum and rotative agitations of the steering wheel, which is actuated by the driver directing the vehicle and, in addition thereto, jolts or vibrations of the vehicle during movement thereof.

It is a further object of the present invention to provide means facilitating movement of the housing of the clock to the extent of 360° relatively to its winding-up mechanism.

It is still another object of the invention to provide means permitting the construction of a highly sensitive and efficacious winding-up mechanism including a plurality of movable pendulum means one encompassing or embracing the other, whereby said pendulum means are supported so as to swing to the extent of 360° with respect to each other, as well as with respect to the housing of the clock.

It is yet a further object of the invention to provide means rendering reaction of said pendulum means possible, so that they may oscillate or move in a direction substantially opposite to the movement of the steering wheel on which said clock mechanism is mounted.

It is still another object of the invention to provide means ensuring displacement of the clock and its winding-up mechanism relative to the steering wheel or its parts, such as the spokes or rim thereof, whereby the forces or power of inertia or momentum may be varied and taken into consideration as power source for driving the winding-up mechanism.

It is still a further object of the invention to provide means offering the possibility of inclinedly mounting the clock mechanism on the steering wheel at an angle of 40°–45° with respect to the horizontal or vertical axis, whereby on account of a relatively slight rotation of the steering wheel swinging movement of one of the pendulum means (for example outer pendulum means) causes correspondingly a winding-up operation of the clock mechanism, while the other pendulum means (inner pendulum means) due to the inclination of the housing of the clock forcedly swings in perpendicular direction to said one pendulum means and preferably to a much greater extent than the oscillations performed by said one pendulum means, whereby the drive of the winding-up mechanism is intensified or increased.

Still another object of the invention is to provide means affording the arrangement of inner and outer pendulum means in Cardanic fashion and to provide further means making possible the transmission of the movements of said pendulum means to said winding-up mechanism by virtue of differential gearing.

Other objects of the invention will be pointed out in the following description and claims and illustrated in the accompanying drawings which disclose, by way of example, the principle of the invention and a preferred mode which has been contemplated of applying said principle.

In the drawings:

Fig. 1 is a longitudinal sectional view of the housing accommodating the clock winding-up mechanism made in accordance with the invention.

Fig. 2 is a part-sectional view taken along line 2—2 of Fig. 1.

Fig. 3 is a top plan view, partly in section, of the housing and mechanism of Fig. 1.

Fig. 4 is a front elevational view seen from the left hand side of Fig. 3 and rotated 90° counterclockwise.

Fig. 5 is a perspective and diagrammatic view of the self-winding clock made in accordance with the invention as affixed to the rim of a steering wheel.

Fig. 6 is an enlarged fragmentary side view and

Fig. 7 is an enlarged fragmentary front view of the steering wheel with self-winding clock according to Fig. 5 attached and seen in two extreme positions of the steering wheel.

Fig. 8 is a top plan view of a self-winding clock with a modified housing and displaceably affixed to a spoke of a steering wheel.

Fig. 9 is an enlarged sectional view taken along line 9—9 of Fig. 8.

Referring now more particularly to the attached drawings, there is disclosed in Fig. 5 a steering wheel 10 which assumes an inclined position at an angle of about 45° with respect to the vertical line. Affixed to the rim 11 of said wheel and preferably in full view of the driver or operator (not shown) is a self-winding clock 12 made in accordance with the present invention.

The winding-up or power mechanism 15 of clock 12 is shown on an enlarged scale in Figs. 1 to 4, and principally comprises energy storage means in the form of inner and outer pendulum means or masses 16, 17 disposed in Cardanic fashion to each other; spindles 18, 19 supporting said pendulum masses, respectively; differential gearing 20 including bevel gears 21—21, 22 in mesh with each other; and ratchet wheels 23—23 with oppositely arranged pawls 24 to thereby provide unidirectional drive means carried by the pendulum masses 16—16.

Outer pendulum means 17, in this instance, is cup-shaped and embraces inner pendulum means 16. Pendulum means 17 on spindle 19 and likewise pendulum means 16 on spindle 18 are disposed to independently swing or rotate to an extent of 360° about the respective axes of said spindles.

Pendulum mass 17 is supported at one end on a suitable pin 26 extending through the wall of housing 25 of the clock and carrying a ball bearing 27 at its inner end 26a against which a threaded plug 29 is seated which is screwed into the hub 28 forming part of said pendulum means 17 to thereby provide unidirectional drive means.

The opposite end of pendulum means 17 is supported by spindle 19 which passes through hub 30 into which extends with tight fit a sleeve member 31 carrying at opposite ends thereof ball bearings 32, 33 for holding spindle 19. Spindle 19 carries at its inner end a bevel gear 22, which meshes with bevel gears 21 mounted on spindle 18, the latter being arranged at right angles to spindle 19.

Spindle 18 extends with its opposite ends toward hubs 34 and 35 forming parts of pendulum means 17. Hubs 34 and 35 threadedly receive plugs 34a and 35a whose inner ends carry ball bearings 36 by which spindle 18 is supported. Pendulum means 16 is disposed at either side of spindle 18 on which are journalled by means of respective ball bearings 37 the opposed bevel gears 21 (Fig. 3).

Affixed to the hubs or extensions 38 of these bevel gears 21 are toothed rims forming ratchet wheels 23 which cooperate with oppositely arranged pawls 24 pivoted on and supported by said pendulum means 16. As can be seen from Fig. 2, pendulum means forming parts 16 are affixed by means of screws 39 on spindle 18.

It will be realized from the aforesaid disclosure that when the pendulum means 16 swings to and fro or 360° around the axis of spindle 18, one of the pawls 24 is actuated when said means 16 swings in clockwise direction whereas the other pawl 24 becomes engaged with the respective ratchet wheel 23 when the pendulum means 16 swings in counter-clockwise direction.

These swinging movements of pendulum means 16 are primarily obtained when starting and stopping the vehicle.

In any of these cases, rotative movement of one or of the other ratchet wheel 23 is transmitted through the respective bevel gear 21 to bevel gear 22 and spindle 19 and thence over ratchet wheel 41 with pawl 42 to a pinion 40 which is affixed to one end of spindle 19.

Oscillations and rotation to the extent of 360° of pendulum means 17 about spindle 19 are utilized due to the above mentioned differential gearing 20 in such manner that ratchet wheel 41 on spindle 19 and pawl 42 anchored and pivoted on inner face of clock mounting member 43 prevent rotation of spindle 19 in undesired reverse direction.

These swinging movements of pendulum means 17 are primarily initiated by the rotation of the steering wheel of the vehicle.

However, it is to be stressed that any and all vibrations and motions imparted to the vehicle from road unevenness and/or from turning or jerking the steering wheel, must displace and influence both arcuate-shaped (Cardanic fashion) pendulum weights or means 16, 17 with respect to the point of gravity which they normally assume.

As can be visualized from Figs. 3 and 4, pinion 40 is in mesh with gear 44 which rotates through a train of gears 50, 45, 45a, 46 toothed wheel 54 which is operatively connected with the motion spring and clock work of the clock (not shown) to wind up the latter.

Toothed wheel 54 is fixed to shaft 53 which is journalled in ball bearings 52 and 55, the latter being positioned in the clock work housing 56.

The housing 25 which contains swinging or winding-up mechanism 15 is covered by mounting member 43 which is affixed to said housing 25 by means of screws 57.

As can be further seen in Figs. 3 and 4, an anchor or mounting member 51 covers partly gearing 44, 50, 45, 45a.

Figs. 6 and 7 show the clock 12 as seen in Fig. 5 in uppermost and lowermost positions, respectively, secured by suitable clamp mechanism 12a, 12b on the steering wheel 10. Clock 12 is turned upside down when the steering wheel 10 is rotated about 180° to the lowermost position, the winding-up mechanism 15 being illustrated in a somewhat sidewardly swinging position caused by impetus or momentum obtained by suddenly and violently moving the steering wheel 10 in the direction of arrow C.

In the upper part of Fig. 6, the sidewardly extending pendulum movements of pendulum means 16 are indicated by dot and dash lines 16a, 16b.

Fig. 8 shows steering wheel 60 in modified form having spokes 61, clock 62 being removably and displaceably attached to one of the spokes 61 and retained in position thereon by means of shim 63 preferably made of rubber as indicated in Fig. 9. A closure plate 64 sunk into the housing engages the clock housing and is secured thereto by means of countersunk screws 65.

It will thus be seen that there has been provided according to this invention a clock or timepiece having a source of driving energy, said timepiece being equipped with a mechanism for replenishing said source, a housing for said mechanism mounted on the steering wheel of an automotive vehicle, means journalling said mechanism in said housing, said mechanism including pendulum means, differential gear means operatively connected to said pendulum means, and means operatively connecting said differential gear means with said source of driving energy, whereby said housing may be subjected to a rotative movement of 360° by said steering wheel and relatively to said winding-up mechanism which, in turn, may rotate about 360° relatively to said housing due to jolts received by the vehicle as well as due to movements of the steering wheel actuated by the driver directing the vehicle.

This invention, therefore, refers to the combination, in an automotive vehicle, of a steering wheel, with a timepiece including a winding-up mechanism therefor, a housing for said timepiece and winding-up mechanism, said winding-up mechanism being journalled in said housing and comprising at least two pendulum masses one swivelly supported by the other and embraced thereby, whereby rotative movements of the steering wheel to the extent of 360° are imparted to said housing and said masses and thence to said timepiece with which said masses are operatively connected through means translating oscillatory motions for winding said timepiece.

It it well understood that instead of ball bearings other means, such as jewels, stones etc. for supporting spindles or shafts hereinabove referred to, may be used.

It is further to be noted that the pendulum means 17 may be equipped with ratchet wheels and pawls becoming effective in opposite directions of oscillations of said pendulum 17 to transmit the power drive to toothed wheel 54. This application constitutes a continuation-in-part of copending U. S. patent application Serial No. 19,038, filed April 5, 1948.

As many possible embodiments may be conceived of the above invention, and as alterations and changes may be made in the embodiment above set forth, it is to be stated that all matters hereinbefore explained or shown in the accompanying drawings, are to be interpreted as illustrative and not in a limitative sense.

Having thus described the invention, what is claimed as new and desired to be secured as Letters Patent, is:

1. A timepiece adapted for mounting on the steering wheel of a vehicle; comprising a winding mechanism including a plurality of pendulums, said winding mechanism being operatively connected to said timepiece, a housing for said winding mechanism, one of said pendulums embracing another of said pendulums, means supporting said pendulums one within another and with their axes in angular relation to each other within said housing in such manner that due to rotative movements of the steering wheel and vibrations caused by the vehicle, movements are imparted to said pendulums in a direction opposite to the relative movements of said housing which partakes of the rotative movement of the steering wheel, to thereby obtain a sufficiently large power source for said mechanism to wind up said timepiece.

2. A timepiece adapted for mounting on the steering wheel of a vehicle; comprising a winding mechanism for which a power source is obtained from rotative movements of the steering wheel and vibrations of the vehicle when in motion, a housing supporting said winding mechanism and adapted to be fixed on said steering wheel, said winding mechanism including a plurality of pendulums journalled within said housing, each of said pendulums including a respective spindle, the axes of said spindles being arranged at right angles to each other, one of said pendulums being shaped to swing within another of said pendulums, said pendulums being connected to each other in Cardanic formation, so as to perform oscillation of full 360° and in a direction opposite to said rotative movements of said steering wheel, and means connected to said pendulums and translating oscillatory movements to rotary motions for winding said timepiece.

3. The combination, in an automotive vehicle, of a steering wheel forming part of said vehicle, with a timepiece of the type adapted to be wound, a winding-up mechanism therefor arranged on said steering wheel, said winding-up mechanism including an operative connection to said timepiece and being provided with a plurality of nested pendulums pivoted for oscillation within one another, said operative connection including a drive from said pendulums, said pendulums being arranged to swing in different planes with respect to each other to about 360° around their respective axes of oscillation.

4. The combination, in an automotive vehicle, of a steering wheel forming part of said vehicle, with a timepiece having an energy storage means including a power mechanism for storing energy therein for driving the timepiece arranged eccentrically to and on said steering wheel, said power mechanism including a plurality of pendulums and differential gear means operated thereby and connected to said energy storage means, and means for supporting one of said pendulums on and embraced by another of said pendulums, said pendulums being arranged to swing in different planes with respect to each other around their respective axes of oscillation.

5. The combination, in an automotive vehicle, of a steering wheel, with a timepiece of the type adapted to be wound including a winding-up mechanism therefor, a housing having an inner structure, said winding-up mechanism being journalled on said inner structure of said housing and comprising at least two pendulum masses, one of said pendulum masses being swivelly supported and embraced by another of said pendulum masses, whereby rotative movements of the steering wheel to the extent of 360° are imparted to said housing and said masses and thence to said timepiece, and means operatively connecting said pendulum masses for winding said timepiece.

6. In a timepiece having a source of driving energy; a mechanism for replenishing said source, a housing for said mechanism, means within the interior of said housing journalling said mechanism therein, said mechanism including at least two pendulum masses, differential gear means operatively connected to said pendulum masses, said pendulum masses being arranged to each other in Cardanic formation, so that one of said pendulum masses is swivelly supported by the other of said pendulum masses within said housing, whereby pendulum oscillations of about 360° may be performed within said housing, and means operatively connecting said differential gear means with said source of driving energy.

ZVONKO MAAR.

REFERENCES CITED

The following references are of record in the file of this patent:

UNITED STATES PATENTS

| Number | Name | Date |
|---|---|---|
| 2,234,527 | Hollingsworth | Mar. 11, 1941 |

FOREIGN PATENTS

| Number | Country | Date |
|---|---|---|
| 3,302 | Great Britain | of 1877 |
| 157,383 | Switzerland | Dec. 1, 1932 |
| 169,397 | Switzerland | Aug. 1, 1934 |
| 257,250 | Italy | Feb. 20, 1928 |
| 802,299 | France | June 6, 1936 |